(12) United States Patent
McLeod et al.

(10) Patent No.: US 9,022,340 B2
(45) Date of Patent: May 5, 2015

(54) FORMED TUBE WITH FORMED WIRE RIVET

(75) Inventors: R. Daniel McLeod, Midhurst (CA); Don Desroches, Penetanguishene (CA)

(73) Assignee: Techform Products Limited, Penetanguishene, Ontario (CA)

( * ) Notice: Subject to any disclaimer, the term of this patent is extended or adjusted under 35 U.S.C. 154(b) by 62 days.

(21) Appl. No.: 13/425,740

(22) Filed: Mar. 21, 2012

(65) Prior Publication Data

US 2012/0241584 A1    Sep. 27, 2012

Related U.S. Application Data

(60) Provisional application No. 61/454,905, filed on Mar. 21, 2011.

(51) Int. Cl.
| | | |
|---|---|---|
| *A47B 97/00* | (2006.01) | |
| *B60N 2/28* | (2006.01) | |
| *B21C 37/10* | (2006.01) | |
| *B21K 25/00* | (2006.01) | |
| *B21J 15/02* | (2006.01) | |

(52) U.S. Cl.
CPC .............. *B60N 2/2887* (2013.01); *B60N 2/289* (2013.01); *B21C 37/10* (2013.01); *B21K 25/00* (2013.01); *B21J 15/02* (2013.01)

(58) Field of Classification Search
USPC ............... 248/500, 503, 503.1; 297/251, 253, 297/256.16
See application file for complete search history.

(56) References Cited

U.S. PATENT DOCUMENTS

| | | |
|---|---|---|
| 1,647,992 A | 11/1927 | Hartman |
| 1,690,408 A | 11/1928 | Hasenflue |
| 2,583,806 A | 1/1952 | Batzle |
| 3,705,738 A | 12/1972 | Yoshimura |
| 3,912,315 A | 10/1975 | Yamanaka |
| 4,838,513 A | 6/1989 | Kondo |
| 4,896,908 A | 1/1990 | Kleefeldt |
| D308,627 S | 6/1990 | Guffey |
| 4,961,504 A | 10/1990 | Larson |
| 4,981,313 A | 1/1991 | Makamura |
| 5,215,342 A | 6/1993 | Yuge et al. |
| 5,487,588 A | 1/1996 | Burleigh et al. |
| 5,524,965 A | 6/1996 | Barley |
| 5,729,951 A | 3/1998 | Frolehlich |

(Continued)

FOREIGN PATENT DOCUMENTS

| | | |
|---|---|---|
| AU | 4339079 | 5/1983 |
| CA | 1043834 | 12/1978 |

(Continued)

OTHER PUBLICATIONS

International Search Report dated Jan. 22, 2008, PCT/US2006/44323, pp. 1-3.

(Continued)

*Primary Examiner* — Steven Marsh
(74) *Attorney, Agent, or Firm* — Dickinson Wright PLLC

(57) ABSTRACT

A method performed and apparatus formed to fabricate an Isofix latch wire arrangement bends an elongated strip about an open profile to form an elongated tubular member, radially penetrating the member with wires across the open profile, and forming enlarged portions on the legs. The enlargements engage opposite sides of the tube to complete abutment of the strip edges to close the profile and join the wires as rivets to the tubular member formed.

20 Claims, 3 Drawing Sheets

(56) References Cited

U.S. PATENT DOCUMENTS

| | | | |
|---|---|---|---|
| 5,941,600 A | 8/1999 | Mar et al. | |
| 5,975,611 A | 11/1999 | Hoshihara et al. | |
| 6,000,737 A | 12/1999 | Yiu | |
| 6,082,818 A | 7/2000 | Muller et al. | |
| 6,108,894 A | 8/2000 | Mizuki et al. | |
| 6,155,618 A | 12/2000 | Ichinose | |
| 6,193,310 B1 | 2/2001 | Batalaris et al. | |
| 6,234,572 B1 | 5/2001 | Shiino et al. | |
| 6,276,754 B1 | 8/2001 | Youssef-Agha et al. | |
| 6,334,649 B1 | 1/2002 | Boegge et al. | |
| 6,354,648 B1 | 3/2002 | Allan et al. | |
| 6,361,115 B1 | 3/2002 | Aufrere et al. | |
| 6,416,129 B1 | 7/2002 | Hirota | |
| 6,481,800 B2 | 11/2002 | Duncan | |
| 6,485,055 B1 | 11/2002 | Swayne et al. | |
| 6,499,786 B2 | 12/2002 | Takahashi | |
| 6,554,357 B2 | 4/2003 | Moffa | |
| 6,604,793 B2 | 8/2003 | Habedank | |
| 6,634,710 B1 | 10/2003 | Adamson et al. | |
| 6,698,080 B2 | 3/2004 | Sawajiri et al. | |
| 6,983,526 B2 * | 1/2006 | Duffy et al. | 29/514 |
| 7,131,693 B2 | 11/2006 | Smallwood et al. | |
| 7,410,215 B2 | 8/2008 | Dehli | |
| 7,484,336 B2 | 2/2009 | Stone | |
| 7,484,800 B2 * | 2/2009 | Duffy et al. | 297/253 |
| 7,721,406 B2 * | 5/2010 | McCay | 29/509 |
| 2002/0008416 A1 | 1/2002 | Deptolla | |
| 2002/0011505 A1 | 1/2002 | Cole et al. | |
| 2002/0089195 A1 | 7/2002 | Sawajiri | |
| 2004/0051356 A1 | 3/2004 | Neelis | |
| 2004/0080193 A1 | 4/2004 | Tong et al. | |
| 2004/0080194 A1 | 4/2004 | Medvecky et al. | |
| 2004/0080195 A1 | 4/2004 | Adams et al. | |
| 2004/0227384 A1 | 11/2004 | Smallwood et al. | |
| 2004/0261246 A1 | 12/2004 | Duffy et al. | |
| 2005/0168024 A1 | 8/2005 | Duffy et al. | |

FOREIGN PATENT DOCUMENTS

| | | |
|---|---|---|
| EP | 0694436 A1 | 1/1996 |
| EP | 1197378 A1 | 4/2002 |
| EP | 1336530 A2 | 2/2003 |
| JP | S61286033 | 12/1986 |
| JP | 2001225681 | 8/2001 |
| JP | 2001225686 | 8/2001 |
| JP | 2002046517 | 2/2002 |
| JP | 2002201830 | 7/2002 |
| JP | 2002211287 A | 7/2002 |
| WO | 03070510 A1 | 8/2003 |

OTHER PUBLICATIONS

International Search Report dated Nov. 9, 2004, PCT/US2004/014742, pp. 1-5.

International Search Report dated Feb. 9, 2005, PCT/US04/20021, pp. 1-4.

* cited by examiner

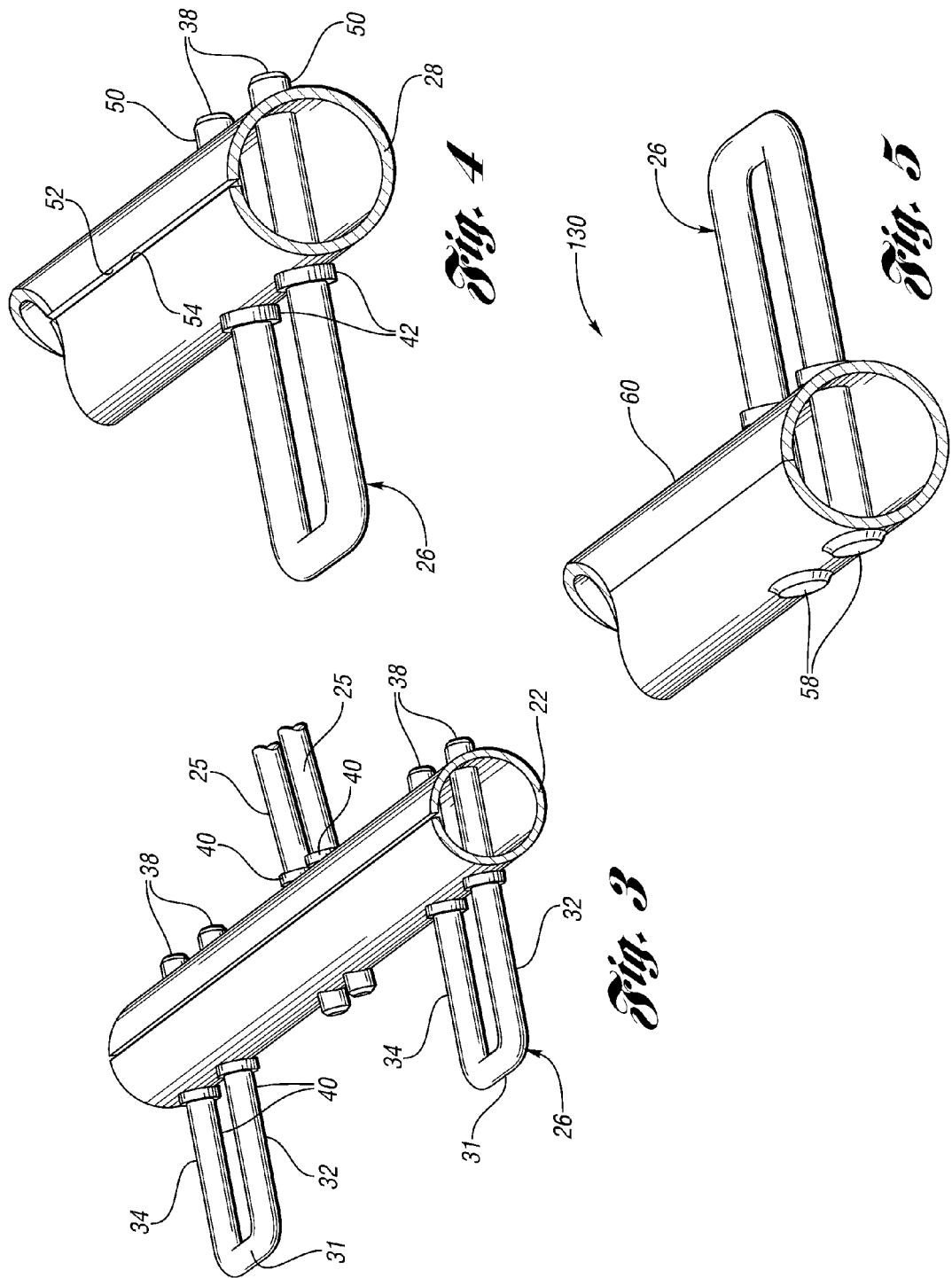

FORMED TUBE WITH FORMED WIRE RIVET

CROSS-REFERENCE TO RELATED APPLICATIONS

This application claims the benefit of U.S. provisional Application No. 61/454,905 filed Mar. 21, 2011, the disclosure of which is incorporated in its entirety by reference herein.

TECHNICAL FIELD

The present invention relates to method and apparatus for reducing time and complexity of producing Isofix child seat restraint anchorages for production original equipment vehicles by combining the formation of the bar with the attachment of latch wires.

BACKGROUND

The production of motor vehicles comprises multiple vertical manufacturing and assembly steps for many of the assemblies or systems contained within a vehicle. Such vertical processing steps substantially increase the cost of producing the vehicle, especially since each part constructed, and the assembly of the parts manufactured into systems, may be accomplished remotely from the subsequent or final vehicle assembly operations. As a result, the more parts and more assembly required to present the assembly for the next or for final assembly into a motor vehicle under automated production conditions could substantially increase the cost of handling and the complexity of final production.

As an example, interior systems such as seating may need to satisfy numerous performance goals. This is particularly true of child seat restraint systems in which a child seat may be restrained by an anchorage system which is assembled to the vehicle chassis or the seating support within the motor vehicle. Not only must such systems restrain a child through various vehicle operating conditions, but such systems must often meet performance and structural standards such as the Federal Motor Vehicle Safety Standards applicable throughout the industry to child seat restraint.

Previous attempts to reduce complexity of structures and processing in the development of seating systems are often related to the particular architecture of a seating or a vehicle structure. Changes in one system often do not provide motivations or suggestions that may be incorporated in others or may not provide cost reduction features in other systems. However, one market segment of seat construction utilizes an Isofix bar. Improvements by manufacturing techniques such as those disclosed in U.S. Pat. Nos. 7,131,693 B2, 6,983,526, and 7,484,800 require separate manufacturing, handling and delivery of tubular bars. These bars have been separately sourced from plants and processes outside the control of the suppliers who may attach latch wires to the tube in order to construct an Isofix bar or fabricate its incorporation with the seating mechanisms of various manufacturers and suppliers to the original equipment vehicle manufacturers. For example, other suppliers' improvements in seating anchorages are also subject to the independent manufacture, handling, adaption and delivery of tubing from others in the manufacture of improved child seat anchorages such as those in U.S. Pat. Nos. 7,721,406 and 6,729,687.

SUMMARY

The present invention overcomes the above mentioned disadvantages by providing a vertically integrated method or apparatus combining tube and rivet assembly. A die formed or roll formed sheet curved to form a tube includes a longitudinal slit that is sealed, at least in part, by rivets. In a preferred embodiment, the rivets are formed by latch wires of the type used for child seat restraints, whose legs may be formed to make collars, and protruding ends that may be enlarged, to abuttingly engage edges of opposed sides of the formed material of the tube extending around a central profile, and securing latch wires to the tube to form latch rings. The rivets can also be inserted through the formed tube in various orientations about the circumference of the tube formed.

As a result, the present invention provides formation of the tube to be employed in structures, for example, Isofix child seat restraint anchorages, by incorporating tube fabrication with the assembly of latch wires or other rivet forming structures. As a result, the present invention may reduce substantial manufacturing and material handling operations that can increase the time and cost of supplying assemblies to manufacturers, and as a result, the time and cost of supplying motor vehicles from [[a]] production assembly operations. A latch ring configuration including the formed tube structure may eliminate welding when providing an alternative clamp mechanism that holds the shape and profile of the tube as desired. In addition, the arrangement and alignment of latch wire rivets may serve to prevent separation at the seam or mating zone of the formed tube's material, and may be adjusted as required to adjust loading requirements upon the assembly.

BRIEF DESCRIPTION OF THE DRAWINGS

The present invention may be more clearly understood by reference to the following detailed description of a preferred embodiment when read in conjunction with the accompanying drawings, in which like reference characters refer to like parts throughout the views, and in which:

FIG. 3 is a perspective view of a child seat restraint anchorage constructed according to the method and apparatus of the present invention;

FIG. 4 is a rotated perspective view of a portion of the assembly shown in FIG. 3; and FIG. 5 is a rotated perspective view of a further completed Isofix arrangement of the method and apparatus according to the present invention, with the environmental structure of the type shown in FIG. 1 removed for the sake of clarity.

DETAILED DESCRIPTION

As required, a detailed description of embodiments of the present invention are disclosed herein. However, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
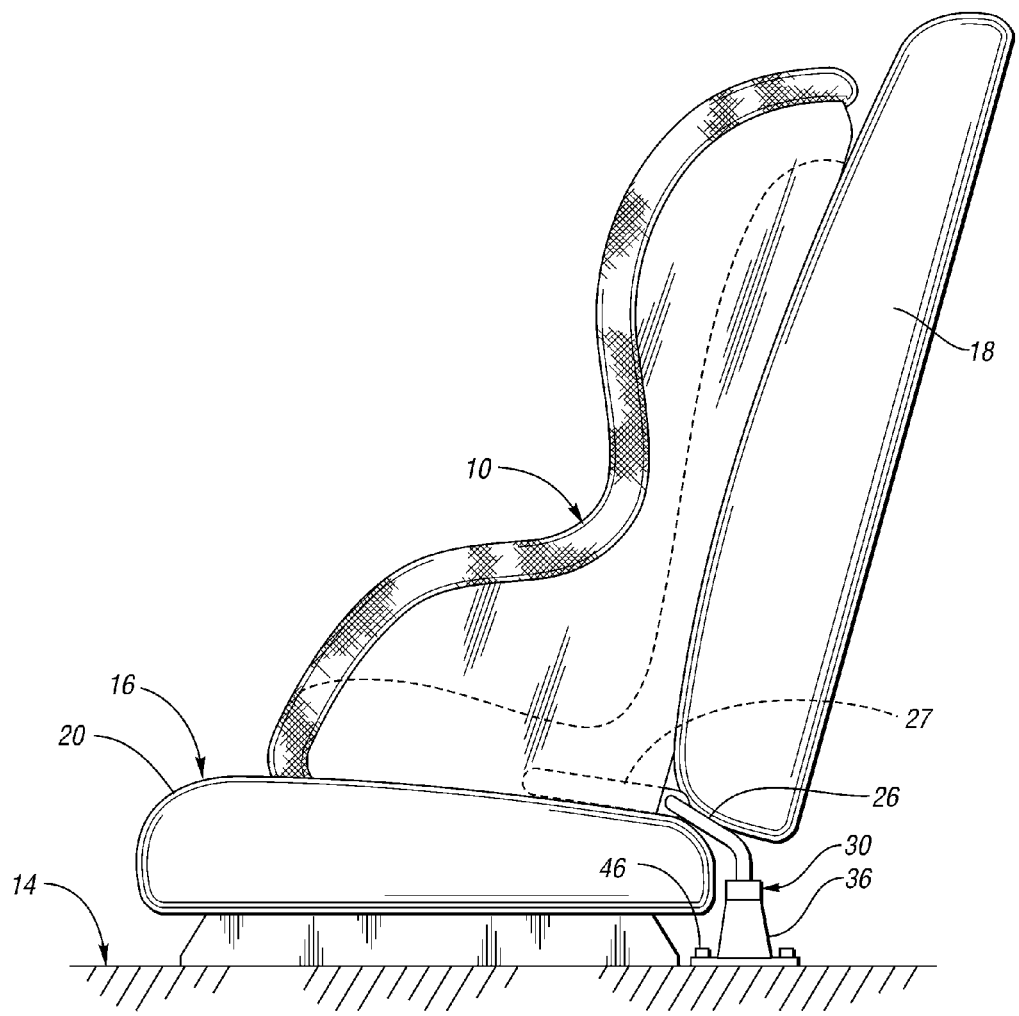
FIG. 1 is an elevational view of a child seat restraint anchorage that demonstrates an Isofix [[the]] type of mechanism subject to FMVSS §225 of a previously known type.
Figure 2:
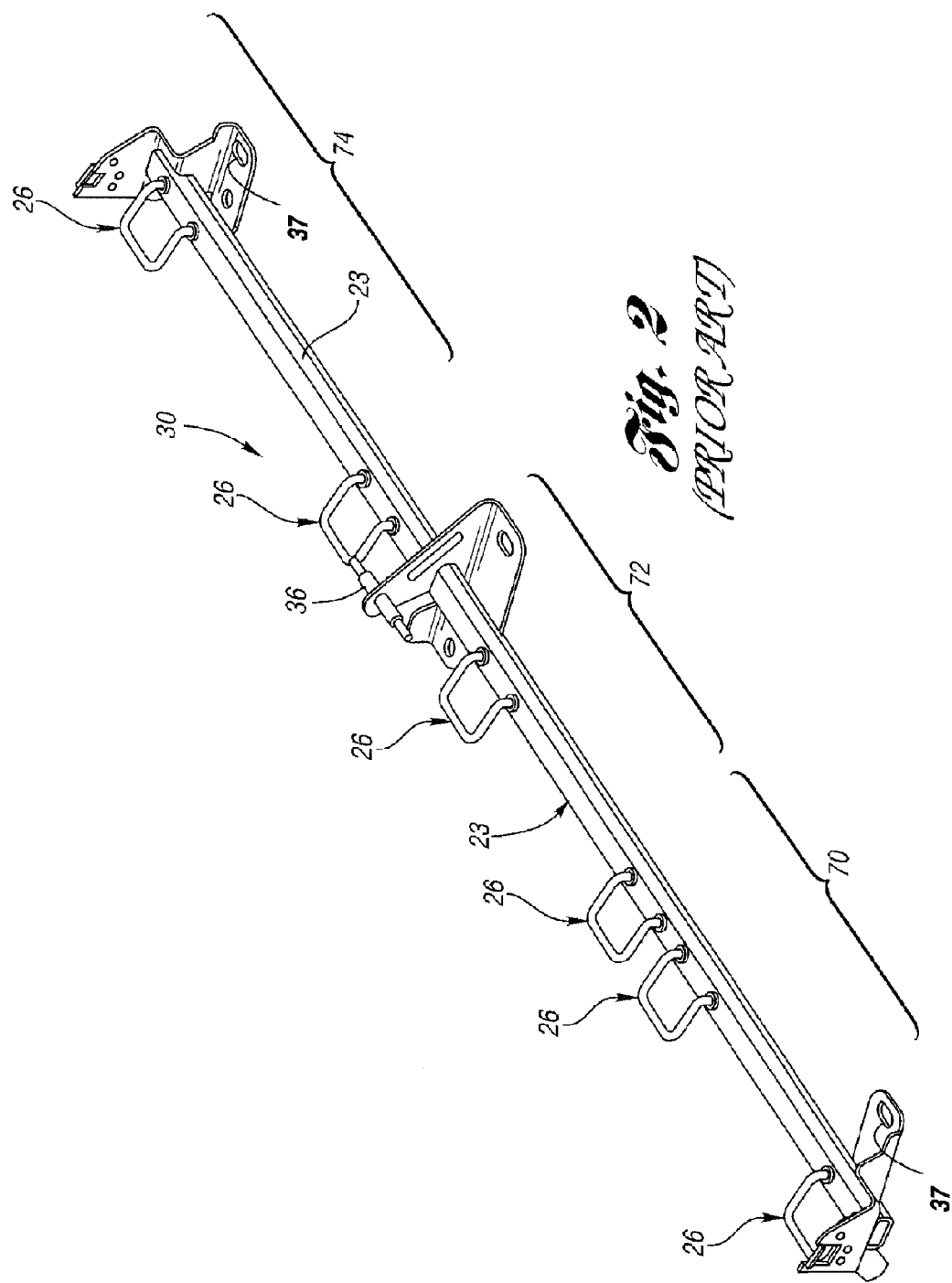
FIG. 2 is a perspective view of a preformed tube modified to support latch wires in the manner of Isofix latch pairs arranged along the tube of a previously known type.

As best shown in the accompanying FIGS. 3-5, a riveted, formed tube 28 according to the present invention may be employed where previously known structures have been employed, for example, the child seat restraint anchorage 30 of FIG. 1 or a known Isofix bar assembly 30 shown in FIG. 2. FIG. 1 displays an environment in which a completed assembly may be employed to meet the structural and performance requirements of Federal Motor Vehicle Safety Standard 225 and others. A vehicle passenger seat 16 includes a seat bottom 20 and a seat back 18. The anchorage 30 carries the latch wires 26 for positioning of a transverse wire portion at the rear of the seat bottom 20 and toward the front of the seat back 18. A bracket, stanchion, or other part of the seat assembly joins the anchorage to the vehicle 14. The child seat 10 is shown carried by the vehicle seat 16 so that a pair of child seat latches 27 are positioned to engage a pair of latch wires 26 in a well-known manner. Nevertheless, it is to be understood that the technology may be employed in other areas without departing from the present invention.

As also shown in FIGS. 3-5 of a preferred embodiment, a cross bar 28, generally profiled in the form of a tube 23 (FIG. 2) of various cross sectional shapes, may be fabricated as a die formed or roll formed sheet 22 (FIG. 3) is enclosed about an open profile and mated with rivets 25. In this preferred embodiment, wires used to form the latch wires 26 may form the rivets 25 to fabricate a riveted, formed tube 60 (FIG. 5). The tube 60 may also be provided with latch wires 26 to form an assembly 130 (FIG. 5).

As shown in the perspective view of FIG. 2, an Isofix bar 30 of known type includes an elongated tube 23. The tube supports a plurality of latch wires 26, preferably in pairs such as 70, 72, 74, that form latch rings when assembled to the tubular member 23. Such an assembly may be attached by appropriate means such as brackets 36, 37 that secure the assembly within another structure, for example, the seat assembly, support, or the vehicle body structures 46 of a vehicle 14 as generically shown in FIG. 1.

As represented in FIGS. 3-5, one or more rivets 25 hold the formed sheet tube 28 (FIG. 4) together. For improved efficiency, the rivets are preferably formed, at least in part, by legs of the latch wires 26. Rivets 25 may extend in opposite or angled directions with respect to each other to demonstrate various angular orientations of the rivets, but may be formed by cold-heading or otherwise modifying the wires. When the legs 32 and 34 that extend from a transverse portion 31 of the latch wire 26 are used to form the rivet, they may be aligned in the same direction, but each penetration of the tube 28 may be angularly adjusted as desired. Moreover, oppositely or angularly disposed legs 32 and 34 may be positioned as desired depending on load requirements of the assembly or to maintain its integrity, throughout the pairs of latch wires 26 on the elongated tubular member 60 (FIG. 5) formed from the rolled sheet 28.

The length 50 of the wire ends 38 that protrude through the sides of the formed tube may be limited by the use of collars 40 (FIG. 3), for example, cold headed shoulder 42 (FIG. 4) received against the opposite side of the formed tube. The length 50 of the protruding portion 38 (FIG. 4) may be controlled depending on the width of the gap to be closed at the seam between the edges 52 and 54 of the formed tube as shown in FIGS. 3 and 4. The ends 38 of the protruding portion 50 may then be formed as collars 40, for example, cold-headed as enlarged head 58, to close the gap of the seam between the abutting ends 52 and 54 of the sheet material forming the tube 28 by roll forming or other shaping fabrication. An enlarged head 58, however enlarged to create a collar 40, for example, like cold-headed shoulder 42, is made with the protruding end 38 of the latch wire 26, engaging the abutting edges of the formed material 28 together, while fixedly positioning and securing the latch wires 26 to form rings along the formed tube 60 (FIG. 5).

While welding may be eliminated, it is not precluded where combinations of the riveted, formed tube 60 can be employed, for example, without the concerns of FMVSS standards, or where vehicle styling or customer pleasing finishes may be applied before assembly that may not be incompatible with welding and previously required welding to be eliminated. Alternatively, welding may be added as a step after assembly, or welding may be used to supplement the integrity of the structure where additional strength or alternative load bearing performance must be provided by the assembly.

A method for making a latch ring on an elongated tubular support comprises bending a wire formed with sufficient cross-sectional area to form two legs 32 and 34 extending directionally from a transverse portion 31 spacing the legs from each other. An embodiment may include a process of forming an elongated tubular member 60 by forming or bends that reorient an elongated strip 22 of material to position longitudinal edges 52 and 54 of the strip 22 at adjacent positions about an open profile for binding with rivets 25. An embodiment may include a structure or process that includes penetrating the latch wire legs 32 and 34 into the strip 22 through the open profile the rolled sheet 28 encloses, and riveting by forming collars 40 at opposed sides of the tubular strip 28 forming the tubular member. An embodiment of a process or structure may include forming enlarged portions 40 on the legs on the opposed sides of the tubular member at a fixed location along the legs 32 and 34 to close any separation between the longitudinal edges 52 and 54, and enclose the profile, fabricating a tube 60 while securing the latch wire 26 to the tube 60 to form a latch ring.

A formed tube 60 with formed wire rivets 25 defines an assembly 130 that comprises a formed sheet 28 presenting longitudinal edges 52 and 54 at adjacent positions about an open profile, and held by a plurality of rivets 25. Where the wires are provided by latch wire legs 32 and 34, including a collar portion 40, such as cold-headed leg portion 42, a protruding portion 38 of the leg extending across the open profile may be formed as an enlarged head 58. When the end 38 is cold-headed to form head 58, the head 58 forces edges 52 and 54 to abut against each other, completing the tube 60 while the head 58 and collar 40 retain the latching wire 26 on the tube 60 while positioning the latching portion 31 for engagement with the latch 27. The legs are preferably attached in pairs as latch wires 26, and the latch wires 26 are coupled in pairs, whereby the latch wires 26 and the tube 60 form the closed latch rings in an assembly 130 that may be configured to replace the assembly 30 of FIG. 2.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for making a latch ring on an elongated tubular support comprising:
   providing a latch wire having two spaced-apart legs separated by a transverse portion, each leg extending from a respective end of the transverse portion to a wire end;
   disposing a first collar around each leg between the transverse portion and the respective wire end;

forming an elongated tubular member by bending an elongated strip of sheet material to position longitudinal edges of the strip at adjacent positions about an open profile, the adjacent longitudinal edges defining an open seam of the tubular member;

penetrating a first surface and a second surface facing opposite the first surface of the tubular member with the legs of the latch wire such that each first collar engages the first surface and the legs extend through the open profile and the wire ends protrude externally from the second surface; and pressing an enlarged head located at the wire end of each leg of the latch wire against the second surface to force the longitudinal edges into abutment and secure the latch wire to the tubular member.

2. A method for making a child restraint seat latch ring anchorage comprising:

providing a latch wire including legs each extending to a wire end and spaced from one another by a transverse portion;

disposing a first collar around at least one of the legs between the transverse portion and the wire end;

forming an elongated tubular member by bending an elongated strip of material to position longitudinal edges of the strip at adjacent positions about an open profile;

penetrating through the open profile and opposed sides of the tubular member with the legs such that the first collar engages one of the sides and the wire end of the at least one leg having the first collar protrudes from the opposing side of the tubular member; and pressing an enlarged portion located on the wire end of the at least one leg having the first collar against the side of the tubular member to force the longitudinal edges into abutment and secure the latch wire to the tubular member.

3. The method of claim 1 including retaining the longitudinal edges in abutment with one another by pressure of the enlarged head and the first collar against the opposite surfaces of the tubular member.

4. The method of claim 1, wherein the step of pressing the enlarged head against the second surface of the tubular member includes cold-heading the wire end protruding externally from the second surface.

5. The method of claim 1, wherein the enlarged head is a second collar disposed around the wire end.

6. The method of claim 1 further including the step of penetrating at least one rivet through the surfaces of the tubular member.

7. The method of claim 6 including forming the latch wire and the at least one rivet from the same wire.

8. The method of claim 6 including the step of disposing a third collar around the rivet and engaging one of the surfaces of the tubular member with the third collar.

9. The method of claim 1 including providing a plurality of the latch wires with the first collar around at least one of the legs;

penetrating through the open profile and the opposite surfaces of the tubular member with the legs of the latch wires such that the first collars engage one of the surfaces and the wire ends of the legs having the first collars protrude from the opposing surface of the tubular member; and pressing enlarged heads located on the wire ends of the legs having the first collars against the surface of the tubular member to force the longitudinal edges into abutment and secure the latch wires to the tubular member.

10. The method of claim 1, wherein the legs of the latch wire are orthogonal to the transverse portion.

11. The method of claim 1, wherein the legs of the latch wire are not orthogonal to the transverse portion.

12. The method of claim 2 including retaining the longitudinal edges in abutment with one another by pressure of the enlarged portion and the first collar against the opposing sides of the tubular member.

13. The method of claim 2, wherein the step of pressing the enlarged portion against the side of the tubular member includes cold-heading the wire end protruding externally from the side.

14. The method of claim 2, wherein the enlarged portion is a second collar disposed around the wire end.

15. The method of claim 2 further including the step of penetrating at least one rivet through the sides of the tubular member.

16. The method of claim 15 including forming the latch wire and the at least one rivet from the same wire.

17. The method of claim 2 including providing a plurality of the latch wires with the first collar around at least one of the legs;

penetrating through the open profile and the opposed sides of the tubular member with the legs of the latch wires such that the first collars engage one of the sides and the wire ends of the legs having the first collars protrude from the opposing side of the tubular member; and pressing enlarged portions located on the wire ends of the legs having the first collars against the side of the tubular member to force the longitudinal edges into abutment and secure the latch wires to the tubular member.

18. The method of claim 2, wherein the legs of the latch wire are orthogonal to the transverse portion.

19. The method of claim 2, wherein the legs of the latch wire are not orthogonal to the transverse portion.

20. The method of claim 2 including attaching the tubular member along a passenger seat of a vehicle; and disposing the latch wire between a seat bottom and a seat back of the passenger seat for engaging a latch of the child restraint seat.

* * * * *